(12) United States Patent
Seo et al.

(10) Patent No.: US 11,488,617 B2
(45) Date of Patent: Nov. 1, 2022

(54) METHOD AND APPARATUS FOR SOUND PROCESSING

(71) Applicant: LG ELECTRONICS INC., Seoul (KR)

(72) Inventors: Jae Pil Seo, Seoul (KR); Keun Sang Lee, Seoul (KR); Jae Woong Jeong, Seongnam-si (KR)

(73) Assignee: LG ELECTRONICS INC., Seoul (KR)

( * ) Notice: Subject to any disclaimer, the term of this patent is extended or adjusted under 35 U.S.C. 154(b) by 306 days.

(21) Appl. No.: 16/657,716

(22) Filed: Oct. 18, 2019

(65) Prior Publication Data
US 2020/0051580 A1 Feb. 13, 2020

(30) Foreign Application Priority Data
Jul. 30, 2019 (KR) .......................... 10-2019-0092619

(51) Int. Cl.
*G10L 21/0208* (2013.01)
*G10L 15/20* (2006.01)
(Continued)

(52) U.S. Cl.
CPC .......... *G10L 21/0208* (2013.01); *G10L 15/18* (2013.01); *G10L 15/20* (2013.01); *G10L 21/0272* (2013.01); *G10L 2015/223* (2013.01)

(58) Field of Classification Search
CPC ................. G10L 21/0208; G10L 15/18; G10L 2015/223; G10L 21/0272; G10L 15/20
See application file for complete search history.

(56) References Cited

U.S. PATENT DOCUMENTS 6,002,776 A * 12/1999 Bhadkamkar ........... H04M 9/00
379/406.16
6,898,612 B1 * 5/2005 Parra .................. H03H 21/0029
708/319
(Continued)

FOREIGN PATENT DOCUMENTS

KR 10-1970347 B1 4/2019
KR 10-1970731 B1 5/2019

OTHER PUBLICATIONS

K. Garg and G. Jain, "A comparative study of noise reduction techniques for automatic speech recognition systems," 2016 International Conference on Advances in Computing, Communications and Informatics (ICACCI), 2016, pp. 2098-2103, doi: 10.1109/ICACCI.2016.7732361. (Year: 2016).*
(Continued)

*Primary Examiner* — Michelle M Koeth
(74) *Attorney, Agent, or Firm* — Birch, Stewart, Kolasch & Birch, LLP

(57) ABSTRACT

Disclosed are a sound processing apparatus and a sound processing method. The sound processing method includes extracting a desired voice enhanced signal by a sound source separation and a sound extraction. By using a multi-channel blind source separation method based on independent vector analysis, the desired voice enhanced signal is extracted from a channel having the smallest sum of off-diagonal values of a separation adaptive filter when the power of the desired voice signal is larger than that of other voice signals. According to the present disclosure, a user may build a robust artificial intelligence (AI) speech recognition system by using sound source separation and voice extraction using eMBB, URLLC, and mMTC techniques of 5G mobile communication.

15 Claims, 7 Drawing Sheets

(51) Int. Cl.
  *G10L 15/18*     (2013.01)
  *G10L 21/0272*   (2013.01)
  *G10L 15/22*     (2006.01)

(56) References Cited

U.S. PATENT DOCUMENTS

| 10,393,571 | B2* | 8/2019 | Shi | G01H 7/00 |
| 10,403,299 | B2* | 9/2019 | Wung | G10L 21/038 |
| 2009/0222262 | A1* | 9/2009 | Kim | G10L 25/84 704/200 |
| 2015/0163604 | A1* | 6/2015 | Fruhauf | A61N 1/36038 607/57 |
| 2019/0122674 | A1* | 4/2019 | Wang | G10L 19/008 |

OTHER PUBLICATIONS

J. Seo, K. Lee and J. Jeong, "Channel Selective Independent Vector Analysis Based Speech Enhancement for Keyword Recognition in Home Robot Cleaner," 2019 IEEE International Conference on Consumer Electronics (ICCE), 2019, pp. 1-3, doi: 10.1109/ICCE.2019.8662029. (Year: 2019).*

S. Gannot, E. Vincent, S. Markovich-Golan and A. Ozerov, "A Consolidated Perspective on Multimicrophone Speech Enhancement and Source Separation," in IEEE/ACM Transactions on Audio, Speech, and Language Processing, vol. 25, No. 4, pp. 692-730, Apr. 2017, doi: 10.1109/TASLP.2016.2647702. (Year: 2017).*

J. Jansky and Z. Koldovsky, "Blind Source Separation Using Incomplete De-mixing Transform with a Precise Approach for Selecting Constrained Sets of Frequencies," 2018 16th International Workshop on Acoustic Signal Enhancement (IWAENC), 2018, pp. 236-240, doi: 10.1109/IWAENC.2018.8521395. (Year: 2018).*

T. Kim, H. T. Attias, S. Lee and T. Lee, "Blind Source Separation Exploiting Higher-Order Frequency Dependencies," in IEEE Transactions on Audio, Speech, and Language Processing, vol. 15, No. 1, pp. 70-79, Jan. 2007, doi: 10.1109/TASL.2006.872618. (Year: 2007).*

Lee H. Simultaneous Blind Separation and Recognition of Speech Mixtures Using Two Microphones to Control a Robot Cleaner. International Journal of Advanced Robotic Systems. Feb. 2013. doi: 10.5772/55408 (Year: 2013).*

* cited by examiner

[FIG. 1]
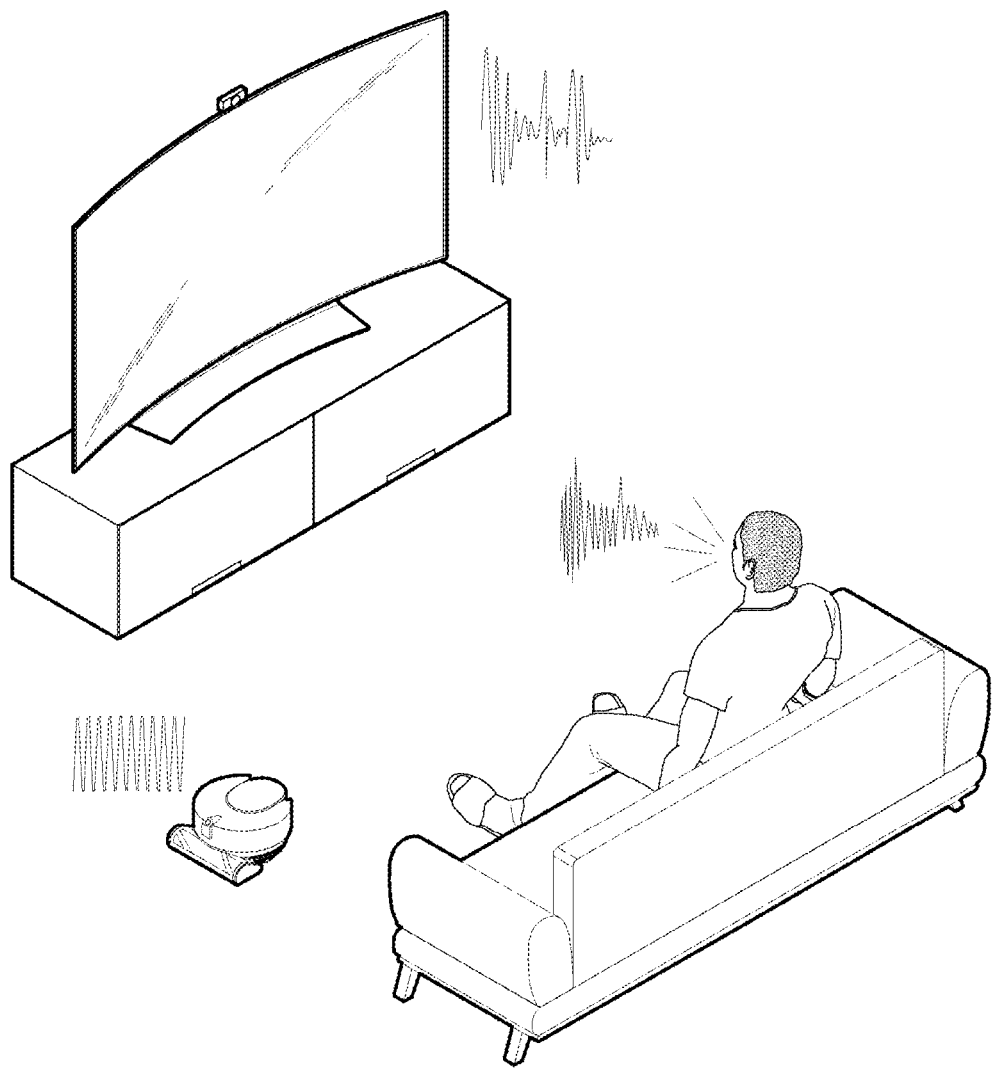

[FIG. 2]
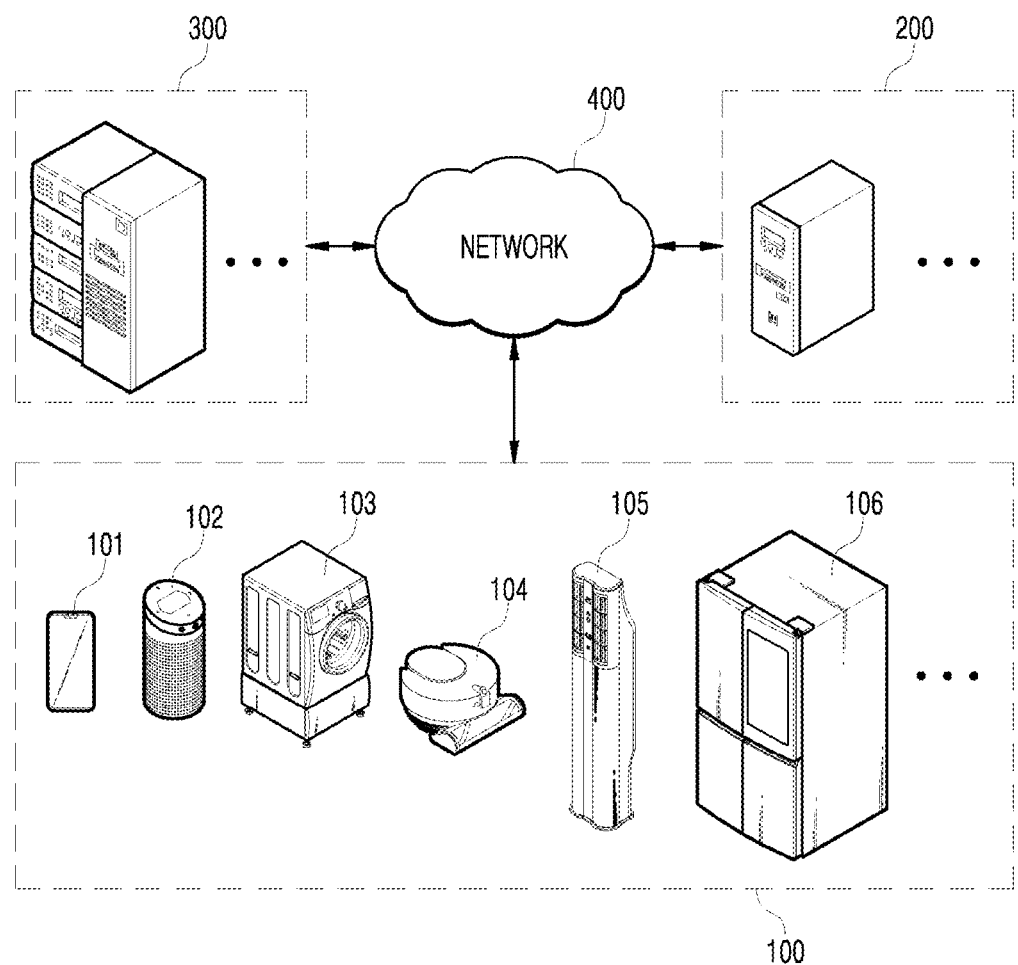

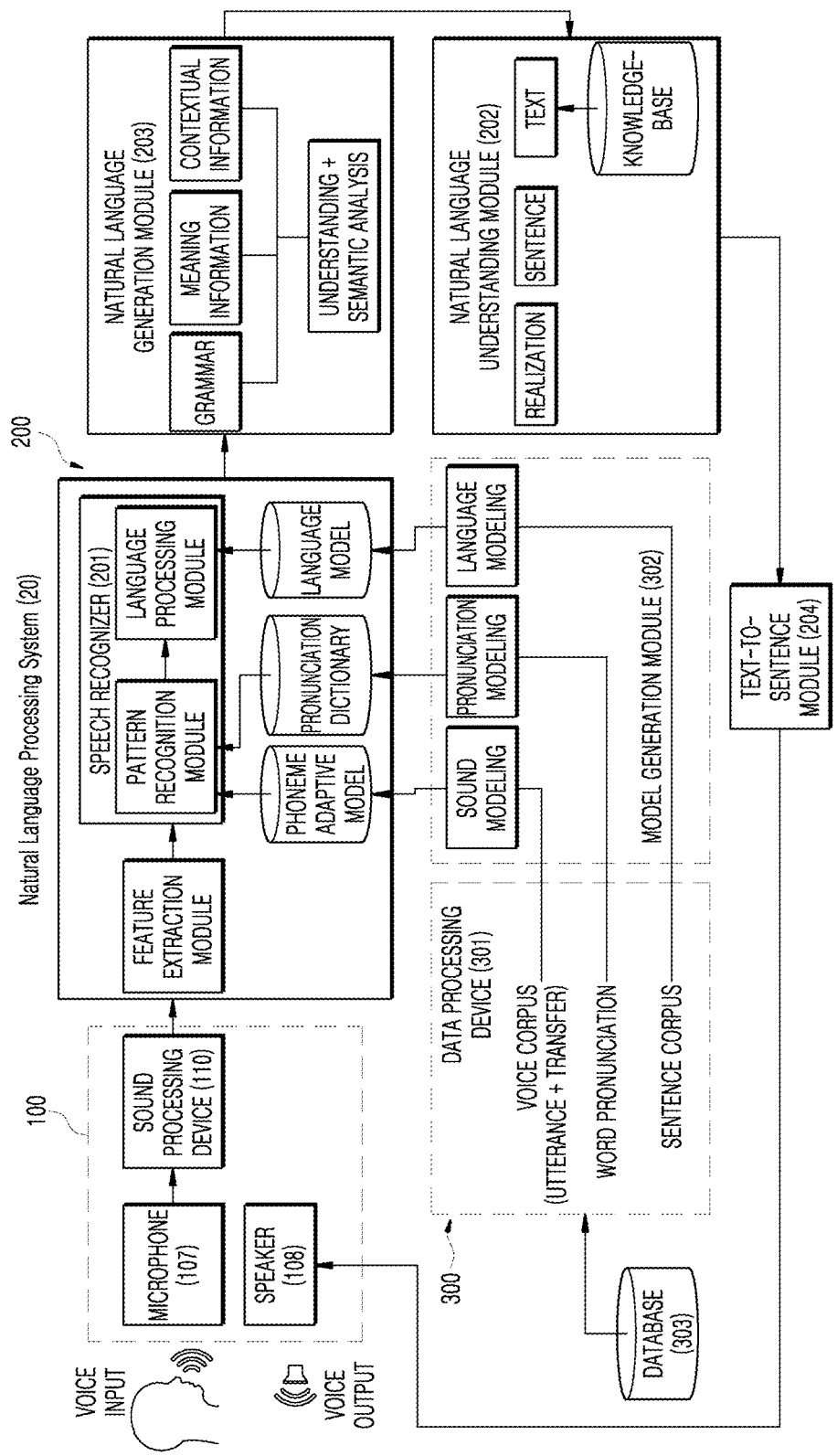
[FIG. 3]

[FIG. 4]
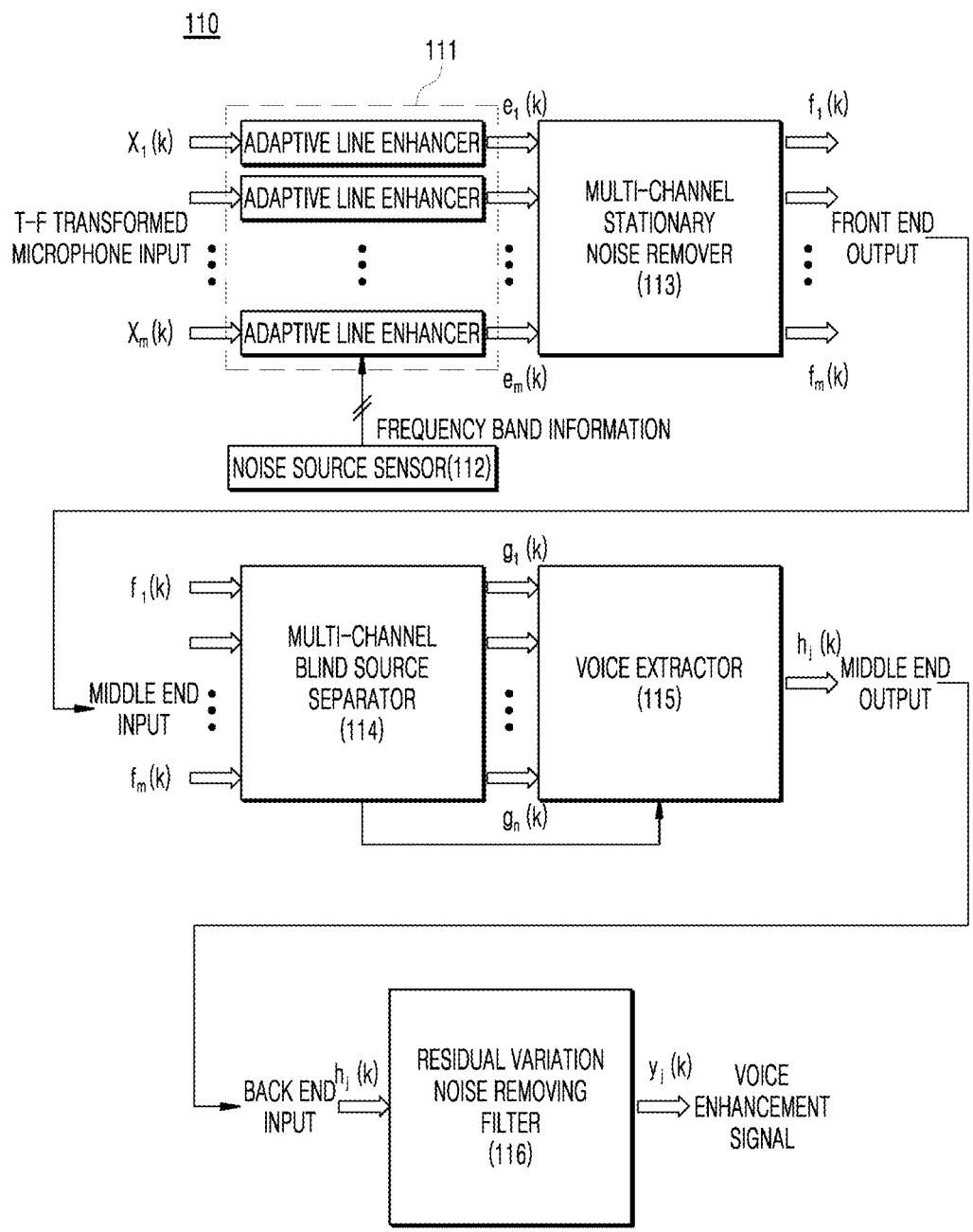

[FIG. 5]
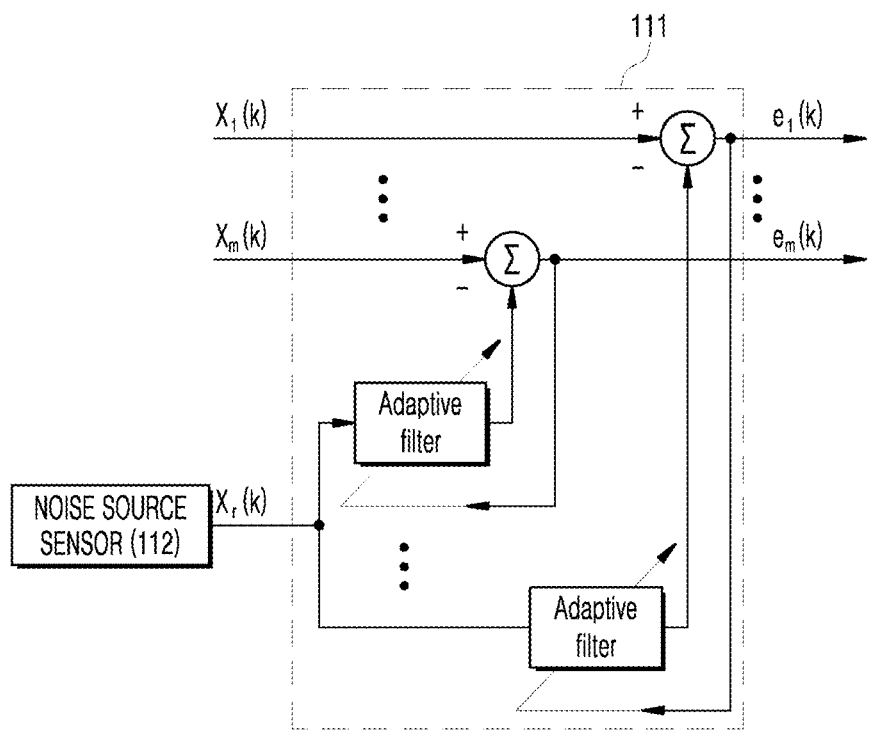
[FIG. 6]
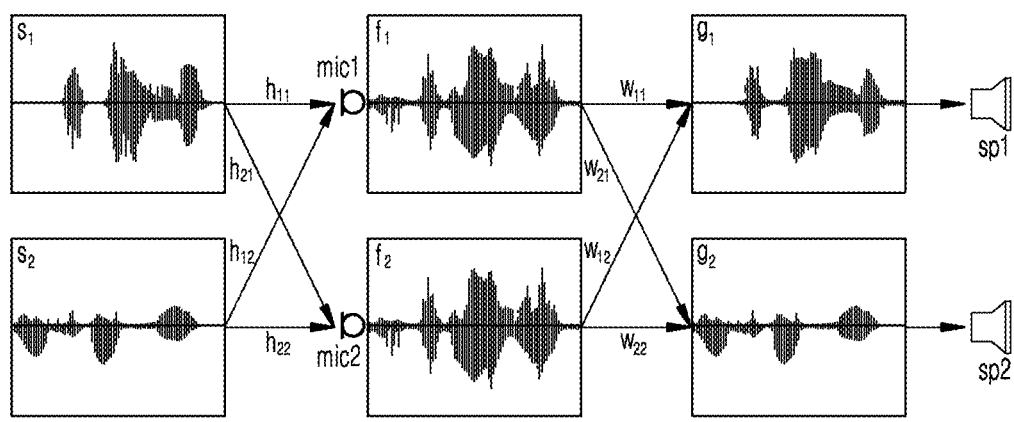

[FIG. 7]
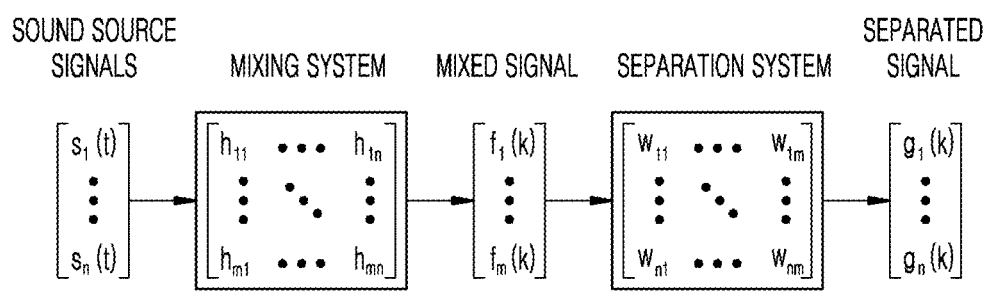
[FIG. 8]
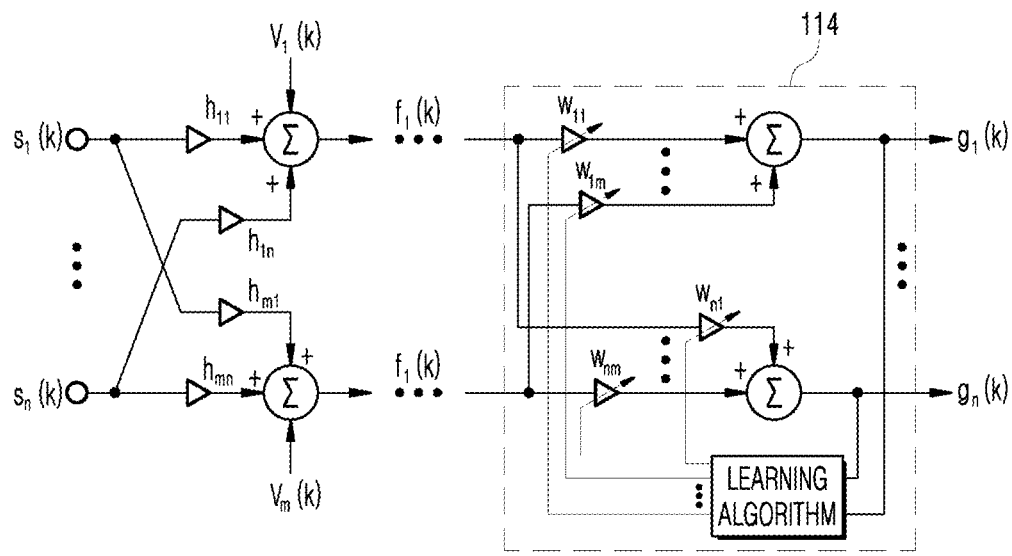

[FIG. 9]
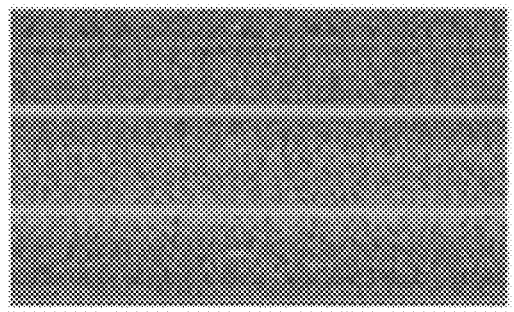
SIGNAL INPUTTED THROUGH MICROPHONE
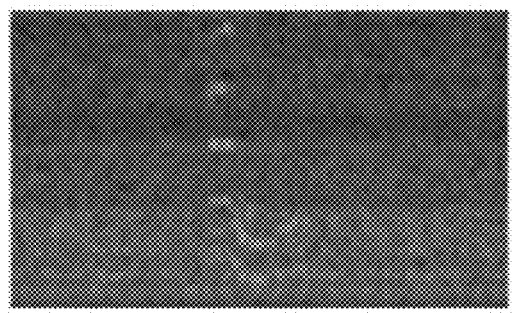
AFTER SIGNAL PROCESSING AT FRONT END
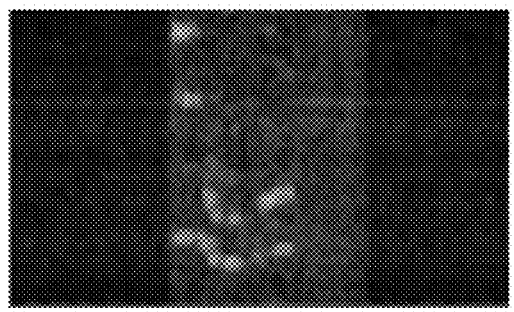
RESULTING SIGNAL AFTER
MULTICHANNEL SIGNAL PROCESSING

METHOD AND APPARATUS FOR SOUND PROCESSING

CROSS-REFERENCE TO RELATED APPLICATION

This present application claims benefit of priority to Korean Patent Application No. 10-2019-0092619, entitled "METHOD AND APPARATUS FOR SOUND PROCESSING," filed on Jul. 30, 2019, in the Korean Intellectual Property Office, the entire disclosure of which is incorporated herein by reference.

BACKGROUND

1. Technical Field

The present disclosure relates to a sound processing method and a sound processing apparatus, and more specifically, to a method for separating a voice signal, which is a command for controlling a device, from noise generated by an operation of the device and acoustic signals from other voice sources, and an apparatus using the same.

2. Description of the Related Art

Speech recognition is a concept that involves recognition, analysis, and understanding of human speech during conversations between a human and a machine. Various techniques are used for speech recognition.

A speech recognition process may be roughly divided into three steps. In a first step, features of human speech are extracted from inputted sound. In a second step, patterns of human speech are classified by measuring a similarity between the extracted features and acoustic models. In a third step, using a language model, the features of the human speech in the classified patterns are processed as language, and finally recognized as a sentence.

In order to obtain a high speech recognition rate in the speech recognition, distractors such as surrounding voice, music, and noise should be removed, while preserving desired signals.

When a plurality of sounds inputted to a microphone are recognized, mixing of a desired signal with the distractors, echo, and the like adversely affects the speech recognition. In this situation, a sound source separation technique for separating and extracting the desired signal from various other signals is required for the speech recognition.

Especially in an environment in which noise due to an operation of a driving motor of a robot cleaner, and sounds that may be misinterpreted as voice commands, such as sound outputted from a TV, are mixed, a noise reduction technique and the sound source separation technique are required at the same time.

As related art, Korean Patent Registration No. 10-1970731, entitled "Artificial intelligent speaker and its control method," discloses an artificial intelligent speaker and control method thereof. In this related art, in an environment in which a voice signal and an audio signal outputted from a TV are mixed, an echo reference signal corresponding to the audio signal is received from a set-top box, and the voice signal and the audio signal of the TV are separated based on the echo reference signal. However, according to this related art, additional wired or wireless equipment is needed to receive an echo reference signal from the set-top box, and the noise which may be removed is limited to the audio signal of the TV.

As another related art, Korean Patent Registration No. 10-1970347, entitled "Speech recognition device for removing noise of speaker speech," discloses a speech recognition device for removing noise from a speaker's voice. In this related art, a first voice input from a first microphone and a second voice input from a second microphone are controlled by adjusting a beam forming sound-receiving angle. However, since this related art is limited to separation between voices, it is difficult to apply the speech recognition technique of this related art to an environment in which a robot cleaner is positioned close to a microphone, and noise from the driving motor of the robot cleaner flows into the microphone.

In applying a sound source separation technique for separating and extracting only a desired sound from among a plurality of sounds, since white noise and an operation noise of a device are mixed in the input signal, there are more sound sources than the number of microphones, which degrades the separation performance. In particular, the speech recognition rate is significantly lowered in devices that have a high level of motor operation noise, such as vacuum cleaners, robots, washing machines, and air conditioners.

According to conventional sound source separation techniques, a desired speech signal is extracted based on fundamental frequency and harmonics of speech. However, the extraction of the desired speech is adversely affected by the degradation of a sound source separator. In addition, it is difficult to apply a method using harmonics of speech in an environment in which a user's voice is mixed with sounds that may be confused with the user's voice, such as sound outputted from a TV.

RELATED ART DOCUMENTS

Related art 1: Korean Patent Registration No. 10-1970731 (Apr. 15, 2019)
Related art 2: Korean Patent Registration No. 10-1970347 (Apr. 12, 2019)

SUMMARY OF THE INVENTION

The present disclosure is directed to addressing the shortcoming of the related art in which environmental sounds that may be removed are limited to sound outputted from a TV.

The present disclosure is further directed to addressing the shortcoming of the related art in which only a beam forming method is used to separate voices of a plurality of speakers.

The present disclosure is still further directed to providing a sound processing apparatus and method for selectively processing a desired voice in an environment in which an operation noise of a device and an undesired voice are mixed.

The present disclosure is not limited to what has been disclosed hereinabove. Other aspects and features of the present disclosure which are not mentioned can be understood from the following description and will be more clearly understood by the embodiments of the present disclosure. In addition, it is to be understood that the aspects and features of the present disclosure may be realized by various means as pointed out in the appended claims and combination thereof.

A sound processing method according to one embodiment of the present disclosure may be performed by a sound processing apparatus.

The sound processing method according to one embodiment of the present disclosure may include extracting a desired signal from among signals generated by a plurality of sound sources collected through a plurality of channels using a plurality of microphones. In extracting a desired signal, a multi-channel blind source separation method based on independent vector analysis may be used, wherein the desired signal may be extracted based on the magnitude of a power value of a voice signal generated by a sound source and the sum of off-diagonal values of a separation adaptive filter. In particular, the desired signal may be extracted based on a relationship, for example, an inverse relationship, between the magnitude of the power value of the voice signal and the sum of the off-diagonal values of the separation adaptive filter.

The sound processing method may include a time to frequency transformation.

The sound processing method may include at least one of removing a tonal noise generated by the operation of a device and inputted to a microphone and removing white noise generated by the operation of the device.

Removing the tonal noise may include removing noise by using a noise source sensor and an adaptive line enhancer (ALE).

At least one of a microphone, an acceleration sensor, and a vibration sensor may be used as the noise source sensor.

Removing the white noise may include removing the white noise by using multi-channel stationary noise reduction.

Extracting a desired voice signal may include separating a voice signal for each sound source based on the sound signal by using multi-channel blind source separator, and extracting the desired voice signal from the separated voice signals.

The extracting of the desired voice signal may include comparing power values of off-diagonal elements in the full frequency band of an adaptive filter in a sound source separator.

The sound processing method may further include removing residual variation noise from the desired voice signal.

According to one embodiment of the present disclosure, disclosed is a sound processing method for obtaining a refined voice enhanced signal for controlling a device from environmental sound including an operation noise of a device and noise including other voices. The sound processing method according to this embodiment of the present disclosure may include: collecting a sound signal through a plurality of channels using a plurality of microphones; removing noise from the sound signal; performing multi-channel blind source separation so as to separate sound sources in the noise-removed sound signal based on independent vector analysis; and extracting a desired voice signal from a channel having the smallest sum of off-diagonal values of a separation adaptive filter when the intensity of the desired voice is larger than the intensity of the other voices.

A sound processing apparatus according to one embodiment of the present disclosure may include a sound source separator configured to separate a desired signal from among signals generated by a plurality of sound sources collected through a plurality of channels using a plurality of microphones. The sound source separator may be configured to perform a multi-channel blind source separation based on independent vector analysis, wherein the desired signal may be extracted based on the magnitude of a power value of a voice signal generated by a sound source and the sum of off-diagonal values of a separation adaptive filter. In particular, the sound processing apparatus may extract the desired signal based on a relationship, for example, an inverse relationship, between the magnitude of the power value of the voice signal generated by the sound source and the sum of the off-diagonal values of the separation adaptive filter.

The sound processing apparatus may further include a transformation module configured to perform a time to frequency transformation.

The sound processing apparatus may include at least one of a filter configured to remove a tonal noise generated by the operation of the device and inputted to the microphone, and a filter configured to remove white noise.

A noise filter may remove the noise by using a noise source sensor and an ALE.

The noise filter may remove the noise by using at least one of a microphone, an acceleration sensor, and a vibration sensor, used as a noise source sensor.

The noise filter may remove the white noise by performing multi-channel stationary noise reduction.

The sound source separator may include a multi-channel blind source separation module configured to separate a voice signal for each sound source based on the sound signal, and a voice extraction module configured to extract a desired voice signal from the separated voice signals.

The sound source separator may be configured to extract the desired voice signal by comparing power values of off-diagonal elements in the full frequency band of the adaptive filter in the multi-channel blind source separation module.

A sound processing apparatus according to one embodiment of the present disclosure may further include a filter configured to remove residual variation noise from the desired voice signal.

A sound processing apparatus according to one embodiment of the present disclosure may include: a plurality of microphones configured to allow a sound signal to be collected through a plurality of channels; a noise filter configured to remove noise from the sound signal; and a sound source separator configured to perform multi-channel blind source separation so as to separate sound sources in the noise-removed sound signal based on an independent vector analysis, wherein the sound source separator extracts a desired voice signal from a channel having the smallest sum of the off-diagonal values of the separation adaptive filter when the intensity of the desired voice is larger than the intensity of other voices.

According to the present disclosure, in an environment in which an operation noise of a device and sounds that may be misinterpreted as voice commands, such as sound outputted from a TV, are mixed, it is possible to provide a speech recognition system with a refined voice signal as a desired signal.

In addition, by observing a frequency spectrum, it is possible to effectively remove the noise in an inherent frequency band of a device operation noise.

In addition, a robust method may be used to select a desired source channel from various noise sources.

BRIEF DESCRIPTION OF THE DRAWINGS

The foregoing and other objects, features, and advantages of the invention, as well as the following detailed description of the embodiments, will be better understood when read in conjunction with the accompanying drawings. For the purpose of illustrating the invention, there is shown in the drawings an exemplary embodiment that is presently preferred, it being understood, however, that the invention is not intended to be limited to the details shown because various modifications and structural changes may be made therein without departing from the spirit of the invention and within the scope and range of equivalents of the claims. The use of the same reference numerals or symbols in different drawings indicates similar or identical items.

FIG. 1 is an exemplary view showing an environment in which a sound processing apparatus according to one embodiment of the present disclosure is used.

FIG. 2 is a network diagram relating to a sound processing apparatus according to one embodiment of the present disclosure.

FIG. 3 is a block diagram showing a speech processing system including a sound processing apparatus according to one embodiment of the present disclosure.

FIG. 4 is a block diagram showing a sound processing apparatus according to one embodiment of the present disclosure.

FIG. 5 is a block diagram showing an adaptive line enhancer according to one embodiment of the present disclosure.

FIG. 6 is an exemplary view showing blind source separation according to one embodiment of the present disclosure.

FIG. 7 is an exemplary diagram showing the relationship of FIG. 6 in a matrix.

FIG. 8 is a block diagram of blind source separator according to one embodiment of the present disclosure.

FIG. 9 is a frequency diagram of a signal measured in a sound processing process according to one embodiment of the present disclosure.

DETAILED DESCRIPTION OF THE INVENTION

The embodiments disclosed in the present specification will be described in greater detail with reference to the accompanying drawings, and throughout the accompanying drawings, the same reference numerals are used to designate the same or similar components and redundant descriptions thereof are omitted. In the following description, the suffixes "module" and "unit" that are mentioned with respect to the elements used in the present description are merely used individually or in combination for simplifying the description of the present disclosure, and therefore, the suffix itself will not be used to differentiate the significance or function or the corresponding term. Further, in the description of the embodiments of the present disclosure, when it is determined that the detailed description of the related art would obscure the gist of the present disclosure, the description thereof will be omitted. Also, the accompanying drawings are provided only to facilitate understanding of the embodiments disclosed in the present disclosure and therefore should not be construed as being limiting in any way.

It should be understood that all modifications, equivalents, and replacements which are not exemplified herein but are still within the spirit and scope of the present disclosure are to be construed as being included in the present disclosure. The terms such as "first," "second," and other numerical terms may be used herein only to describe various elements and only to distinguish one element from another element, and as such, these elements should not be limited by these terms.

Similarly, it will be understood that when an element is referred to as being "connected", "attached", or "coupled" to another element, it can be directly connected, attached, or coupled to the other element, or intervening elements may be present. In contrast, when an element is referred to as being "directly connected", "directly attached", or "directly coupled" to another element, no intervening elements are present.

An intelligent virtual assistant refers to a software agent which, like a personal assistant, handles tasks required by a user, and provides user-specific services. A recent intelligent virtual assistant provides customized information to the user based on an artificial intelligence engine and speech recognition, and performs various functions such as schedule management, email transmission, restaurant reservation, and control of home devices, according to a voice command of the user.

In a smart home automation system, various home devices perform their functions through a hub functioning as an intelligent virtual assistant. In particular, home devices, which are Internet of Things devices included in an embedded system, may perform functions corresponding to a voice command of a user by themselves.

FIG. 1 is an exemplary view showing an environment in which a sound processing apparatus according to one embodiment of the present disclosure is used.

Referring to FIG. 1, it is assumed that a robot cleaner, which is one of the devices, is cleaning a living room floor while a user is watching TV. In this case, the user checks the state of the cleaned living room and tries to stop the operation of the robot cleaner by using a voice command. Various noises are mixed in the living room environment, for example, the operation noise of the motor of the robot cleaner generating a vacuum, the operation noise of the motor driving the moving wheel of the robot cleaner, the intermittent friction sound between the wheel and the floor, and the sound outputted from the TV. In this case, in order for the robot cleaner to recognize the voice of the stop command, a voice signal within a range capable of being recognized by the robot cleaner should be inputted to the robot cleaner.

In order for the robot cleaner to recognize a voice command of the user, a preprocessing process of an input signal is required to remove the various operation noises and white noise generated by the robot cleaner itself, and the sound outputted from the TV.

Hereinafter, various devices including a user terminal, in which a sound processing apparatus according to one embodiment of the present disclosure may be utilized, will be described. However, the present disclosure is not limited to the indicated devices in which the sound processing apparatus is utilized, and the sound processing apparatus may be widely applied to electronic devices which may operate according to speech recognition.

FIG. 2 is a network diagram relating to a sound processing apparatus according to one embodiment of the present disclosure.

Referring to FIG. 2, a device 100 in which the sound processing apparatus may be utilized is shown. The device 100 may include a smartphone corresponding to a terminal 101, an artificial intelligence speaker 102 with an artificial intelligence assistant function, a smart washing machine 103, a smart robot cleaner 104, a smart air conditioner 105, and a smart refrigerator 106. In addition, the sound processing apparatus according to one embodiment of the present disclosure may be utilized for various electronic devices having a smart function, that is, a speech recognition function.

In order to control the operation of the device 100 using voice commands, a speech recognition process is required. Specifically, when an utterance is generated by the user and a voice corresponding to the utterance is inputted into the device 100, the device 100 recognizes the contents of the command included in the user's utterance and controls its operation by itself according to the command.

A natural language processing process, which includes a speech recognition step required in the process of controlling the device 100 using voice commands and various further steps after the speech recognition step, will now be described. Among the devices 100, the terminal 101 and the artificial intelligence speaker 102 may perform functions related to the natural language processing as well as the speech recognition. The other devices may also be made to perform an interactive function.

Referring again to FIG. 2, the device 100 that is operated by voice commands, a natural language processing server 200, and a data processing server 300 are communicatively connected through the network 400.

A sound processing apparatus 110 according to one embodiment of the present disclosure may be implemented in various forms. For example, the sound processing apparatus 110 may be one of the various components constituting the device 100. In particular, the sound processing apparatus 110 may be a component of a device that has a large operation noise, such as a robot cleaner or a washing machine.

In addition, the sound processing apparatus 110 may be one of the various components constituting the natural language processing server 200 or the data processing server 300.

In addition, the sound processing apparatus 110 may be an independent apparatus for preprocessing purposes.

The natural language processing server 200 recognizes speech, understands the contents of the recognized speech, and generates natural language based on the understood contents. The natural language processing server 200 may consist of a plurality of servers by configuring a separate server for each function to be performed.

The data processing server 300 processes various data to build a database and a knowledge base for various models for speech recognition and understanding and generation of natural language required in the natural language processing. The data processing server 300 may consist of a plurality of servers by configuring a separate server for each function.

As used herein, the network 400 may be a wired or wireless network such as a local area network (LAN), a wide area network (WAN), the Internet, an intranet, and an extranet. The network may also be a mobile network such as cellular, 3G, 4G, LTE, 5G, or a Wi-Fi network, an ad hoc network, and any suitable communication network including combinations thereof.

The network 400 may include connections of network elements, such as hubs, bridges, routers, switches, and gateways. The network 400 may include a public network such as the Internet, and a private network such as a secured private network for the enterprise, and may also include one or more connected networks, such as a multi-network environment. Access to the network 400 may be provided through one or more wired or wireless access networks.

FIG. 3 is a block diagram of a natural language processing system including a sound processing apparatus according to one embodiment of the present disclosure.

Referring to FIG. 3, a natural language processing system 20 is a system configured to perform a complex function of recognizing various types of speech and outputting processing results in the form of words and characters through natural language processing based on the recognized speech.

The natural language processing system 20 may provide a speech recognition service to the device 100 corresponding to the smart electronic device through various speech recognition service domains. Here, the speech recognition service is not limited to human speech recognition, but may include an artificial intelligence assistant function through natural language processing, and an electronic device control service through a voice interface.

The natural language processing system 20 may be configured to perform the entire speech processing including speech recognition, natural language understanding, natural language generation, and speech synthesis. The natural language processing system 20 may consist of one server such as a computing device, or may consist of one or more servers by configuring a separate server for each of speech recognition, natural language understanding, natural language generation, and speech synthesis.

The sound processing apparatus 110 according to one embodiment of the present disclosure is an apparatus configured to preprocess audio data for refining speech data in a stage before speech recognition. This is because the speech recognition rate by the natural language processing system 20 may be increased by refining the voice data.

The device 100 may include a voice input/output interface and include an embedded system for the Internet of Things. The device 100 may include various electronic devices having the Internet of Things (IoT) function, for example, a terminal 101 performing an artificial intelligence assistant function, an artificial intelligence speaker 102 serving as a hub for connecting device to a network 400, a washing machine 103, a robot cleaner 304, an air conditioner 105, and a refrigerator 106.

However, examples of the device are not necessarily limited to those described in FIG. 2. Hereinafter, the description will be made with reference to the terminal 101 among devices 100.

The terminal 101 may be connected to the natural language processing system 20 through a corresponding domain to use the speech recognition service. The representative speech recognition service provided by the terminal 101 is an artificial intelligence assistant function using an application. The artificial intelligence speaker 102 is a speaker which functions as an agent using an artificial intelligence (AI) algorithm, and may act as a hub controlling an electronic device without voice input/output functionality. In addition, since the home devices 103 to 106 include a voice input/output function, the user may control the home devices 103 to 106 using the voice interface. For this reason, the devices 100 are referred to as smart electronic devices.

The devices 100 may transmit data to and receive data from the servers 200 and 300 via the 5G network. In detail, the device 100 may perform data communications with the server 200 and 300 using at least one among an enhanced mobile broadband (eMBB), ultra-reliable and low latency communications (URLLC), and massive machine-type communications (mMTC) through a 5G network.

Enhanced Mobile Broadband (eMBB) is a mobile broadband service, and provides, for example, multimedia contents and wireless data access. In addition, improved mobile services such as hotspots and broadband coverage for accommodating the rapidly growing mobile traffic may be provided via eMBB. Through a hotspot, the large-volume traffic may be accommodated in an area where user mobility is low and user density is high. Through broadband coverage, a wide-range and stable wireless environment and user mobility may be guaranteed.

A URLLC service defines the requirements that are far more stringent than existing LTE in terms of reliability and transmission delay of data transmission and reception, and corresponds to a 5G service for production process automation in the industrial field, telemedicine, remote surgery, transportation, safety, and the like.

Massive Machine-type communications (mMTC) is a transmission delay-insensitive service that requires a relatively small amount of data transmission. A much larger number of terminals, such as sensors, than a general portable phone may be connected to a wireless access network by mMTC at the same time. In this case, the communication module price of the terminal should be inexpensive, and there is a need for improved power efficiency and power saving technique capable of operating for years without battery replacement or recharging.

The natural language processing system 20 may recognize speech using a voice signal inputted to a microphone 107 included in the device 100 and preprocessed; understand the contents of the speech based on the recognized voice; generate natural language based on the understood content; converts the natural language into text; and synthesizes speech capable of being outputted from the speaker 108 using the converted text. In this process, the sound processing apparatus 110 according to one embodiment of the present disclosure may preprocess audio data.

The natural language processing system 20 may include an automatic speech recognizer (ASR) 201, a natural language understanding (NLU) module 202, a natural language generation module 202, natural language generation (NLG) module 203, and a text-to-sentence (TTS) module 204, each performing a series of processes from input to output of speech. Here, the components of the natural language processing system 20 may be configured as one server or as one or more servers.

Referring again to FIG. 3, the natural language processing performed by the ASR 201 to the TTS module 204 is referred to as an online phase. In an off-line phase, data collection, data processing, and various model learning processes necessary for speech recognition using the data collection and the data processing are performed by a data processing device 301 and a model generation module 302.

The data processing device 301 may collect, sort, and process data to generate a speech corpus, information on word pronunciation, and a sentence corpus. The model generation module 302 performs sound modeling, pronunciation modeling, and language modeling using the above information, and as a result, generates a phoneme adaptive model, a pronunciation dictionary, and a language model, respectively. Here, the phoneme adaptation model, the pronunciation dictionary, and the language model are used as a judgment factor necessary for speech recognition by the speech recognition engine. That is, as more data is used for learning, the recognition rate of the ASR 201 may be higher.

FIG. 4 is a block diagram of a sound processing apparatus according to one embodiment of the present disclosure.

Referring to FIG. 4, a sound processing apparatus 110 may include a multi-channel blind source separator 114 and a voice extractor 115. In order to remove noise included in the input signal, the sound processing apparatus 110 may further include an adaptive line enhancer 111, a noise source sensor 112, and a multi-channel stationary noise remover 113. In addition, the sound processing apparatus 110 may further include a residual variation noise removing filter 116. The sound processing apparatus 110 may be configured in the order of a front end, a middle end, and a back end as shown in FIG. 4, in order to extract an optimal voice enhanced signal. However, depending on the type and level of noise included in the input signal, the front and back ends may be excluded from the sound processing apparatus 110, or the arrangement order thereof may be changed.

The sound processing device 110 may process a signal received through a plurality of channels. When a sound is inputted to a plurality of microphones corresponding to each channel, the sound may be converted into a plurality of electrical signals.

In FIG. 4, a time to frequency transformed signal may be inputted to the adaptive line enhancer 111 in the front end of the sound processing apparatus 110. This transformation is a kind of time to frequency transformation (TFT), which may be in particular a Fourier transform or a fast Fourier transform.

In the sound processing apparatus according to the embodiment of the present disclosure, in order to improve speech intelligibility, a noise removing method may be used. Depending on the number of sensors or microphones, either a single channel method or a multi-channel method may be used. The single channel method uses spectrum-subtraction to remove fixed distractors and produce good results. An example of a multi-channel method is essentially a beam-forming method of adjusting the microphone array spatial characteristics so that the sensor listens to a desired sound source identified by a spatial parameter, a time parameter, and a spectral parameter, wherein unwanted signals emitted from locations other than the look direction of the desired sound source are attenuated.

A line adaptive filter method may be used to remove tonal noise which occurs due to device operation and flows into a microphone. In this method, a microphone, an acceleration sensor, a vibration sensor, or the like may be used as a sensor to acquire a tonal component generated by the device. The tonal noise may be effectively removed by training the filter by using the acquired tonal component as a reference signal of the adaptive filter and an input signal to the microphone as the main input signal of the adaptive filter.

FIG. 5 is a block diagram of an adaptive line enhancer according to one embodiment of the present disclosure.

Referring to FIG. 5, a signal $x_m$ inputted to a plurality of microphones is inputted to an adaptive line enhancer (ALE) 111, and after the noise is removed from the signal $x_m$ by the ALE 111, a signal $e_m$ is outputted. The ALE 111 removes noise from the main input signal inputted to the plurality of microphones using a noise collected by a noise source sensor 112 as a reference signal. The adaptive filter may be used for removing the noise. A number of adaptive filters corresponding to the number of microphones may be provided. The adaptive filter may recognize the tonal noise included in the input signal by learning.

The ALE 111 is configured based on a linear prediction. The linear prediction means that in the case of a periodic signal, a forthcoming signal can be completely predicted by the linear combination of past signals. The adaptive filter of the ALE 111 may remove, by using the linear prediction, the noise, for example, operation sounds, of various driving motors included in the robot cleaner.

The noise source sensor 112 is used to acquire a reference signal corresponding to the operation noise of the device to be removed. For example, in the case of the washing machine generating a large vibration noise, by disposing the vibration sensor near the washing machine drum, it is possible to acquire frequency information of the noise which varies depending on each setting.

For example, in the case of a cleaner or a robot generating a large motor noise, by disposing a microphone near the motor, it is possible to acquire frequency band information of the noise which varies depending on cleaning modes or the speed of the robot.

The noise generated by the operation of the device includes not only the tonal noise but also stationary noise such as white noise. All the stationary noise other than voice signals, which may be misinterpreted as voice commands, flowing into the microphone may be removed by using the multi-channel stationary noise remover 113 shown in FIG. 4.

After an input signal to a multi-channel microphone is T-F transformed, the transformed input signal is inputted to the multi-channel blind source separator and separated into a number of signals corresponding to the number of sound sources of the input signal, and then the separated signals are outputted. That is, when a signal having n sound sources is inputted to the blind source separator through n microphones, the blind source separator separates the inputted signal into a number of signals corresponding to the n sound sources. A blind source separation (BSS) algorithm is used for sound source separation, and a BSS-based algorithm is used in one embodiment of the present disclosure.

In an environment in which various sound sources exist, a sound source separation technique is one of the techniques required to provide appropriate input to a speech recognition system. An example of a sound source separation technique for extracting a desired sound from sound inputted to a microphone is a blind source separation (BSS) technique using independent component analysis (ICA).

ICA is a technique for separating sound sources by estimating the sound sources from before the signals thereof are mixed using only observed signals, without using information on the sound sources and the mixed signals thereof. ICA is a method of separating a plurality of sound sources by designing a filter so that separated signals are independent of each other based on the assumption that the sound sources are statistically independent of each other. The separation method based on ICA is a method of separating and restoring a desired sound source from a recorded mixed signal by using a blind processing method which does not use prior information on a sound source, based on the idea of the independence between the desired sound source and the noise.

In addition, another example of a sound source separation technique is frequency-domain ICA (FDICA), which estimates a separation matrix for each frequency by applying ICA to each frequency bin of a complex spectrum obtained from a short-time Fourier transform (STFT).

Independent Vector Analysis (IVA) has also been proposed as a method of estimating the separation matrix for each frequency. IVA is a multivariate extension of ICA and assumes a generation model of frequency vectors in which frequency components of each sound source are organized. IVA is a method capable of considering the high-order correlation between frequency components of the same sound source by assuming non-Gaussian multivariate distribution having spherically symmetric properties.

IVA is a method of separating sound sources in a multi-channel frequency domain, and is an extension of ICA. That is, the IVA is an improved FDICA, and assumes that there is a dependency between frequency bins rather than independence for each frequency bin.

FIG. 6 is an exemplary view showing blind source separation according to one embodiment of the present disclosure.

Referring to FIG. 6, two sound sources are assumed in an acoustic scene, that is, a sound source generating a desired signal and a sound source generating an unwanted signal. Where the signals f1 and f2 are the convolutional mixings of the source signals s1 and s2. The mixing matrix h=[h11 h12/h21 h22]. The mixing matrix consists of an impulse response. The impulse response includes all acoustic effects such as direct sound, early reflection sound, and reverberation sound.

FIG. 6 shows the desired signal s1 and the unwanted signal s2 generated by each of the two sound sources. The convolution mixes f1 and f2 of these two signals are captured by the microphones mic1 and mic2, respectively. BSS is essentially a collection of statistical digital signal processing (DSP) techniques which find a matrix w performing a convolutional de-mixing operation.

$$g(z)=w(z)f(z) \qquad \text{Equation 1:}$$

Here, f(z) and g(z) correspond to z-transformation of $f(n)=[f1(n)\ f2(n)]^T$ and $g(n)=[g1(n)\ g2(n)]^T$ vectors, respectively.

FIG. 7 is an exemplary diagram showing the relationship of FIG. 6 in a matrix.

Referring to FIG. 7, a two-channel blind source separation process for separating one desired sound source signal and one unwanted sound source signal is illustrated as a matrix. The sound source signals s1 and s2 generated by each of two sound sources in the time domain may be mixed by a mixing system represented by a $h_{mm}$ matrix and inputted to two microphones in the form of a mixed signal $f_m$. The process of extracting the separated signal $g_n$ from the inputted mixed signal is blind source separation. The blind source separation corresponds to a process of finding a separation system represented by a $w_{nm}$ matrix.

FIG. 8 is a block diagram of a blind source separator according to one embodiment of the present disclosure.

Referring to FIG. 8, a mixed signal $f_m$ is inputted to the input terminal of the multi-channel blind source separator 114, and a separated signal $g_n$ is outputted from the output terminal. The mixed signal, which is an input signal, may include a number of signals corresponding to the number of microphones, and the output signal may include a number of signals corresponding to the number of channels. Here, the number of microphones and the number of channels may be set to the same value. If the separation system is configured as a matrix, each component of the matrix may be configured to correspond to an adaptive filter. Each adaptive filter may find an optimal parameter value by using a learning algorithm in machine learning.

The multi-channel sound source separator is effective for separating sound sources, but the sound source separated for each channel cannot be known unless the signal is checked. That is, even if the voice signal and noise are correctly separated in the noise environment, information on the channel separated as the voice signal is not provided.

In a conventional method, speech is distinguished by estimating the harmonics of separated signals. However, in one embodiment according to the present disclosure, a voice of a desired speaker may be selected by comparing the power values of the off-diagonal components of the full frequency band of an adaptive filter in the sound source separator. Below, it will be formally proven that this method is appropriate.

It is assumed that the blind source separator 114 according to one embodiment of the present disclosure uses an independent vector analysis (IVA) algorithm.

The real-time learning method of the separation adaptive filter of the IVA is defined by Equations 2 and 3.

$$\Delta W_{nm}^k(l)=(I_{nm}-\varphi^k(\hat{S}_n^k(l))(\hat{S}_m^k(l))^*)W_{nm}^k(l) \qquad \text{Equation 2:}$$

$$\varphi^k(\hat{S}_n^k(l)) = \hat{S}_n^k(l)/\sqrt{(\Sigma_{k=1}^K |\hat{S}_n^k(l)|O^2}$$ Equation 3:

It may be seen that the following equation 4 is inferred from the above equations.

$$|W_{n1}^k(l)|^2, \ldots, \left|W_{nm}^k(l)\right|^2 \underset{(n \neq m)}{\propto} 1 / \sqrt{\left(\sum_{k=1}^{K} |\hat{S}_n^k(l)|\right)^2}$$ Equation 4

$$\left|\hat{S}_t^k(l)\right|^2 > \left|\hat{S}_{others}^k(l)\right|^2$$ Equation 5

Referring to Equation 4, it may be seen that the magnitude ($S_n$) of the power value of the voice signal and the sum ($W_{nm}$) of the off-diagonal values of the separation adaptive filter are inversely proportional to each other.

If the user's desired sound source is larger in intensity than other sound sources as shown in Equation 5, it may be determined that the signal of the channel (nth index) having the minimum sum of off-diagonal values of the filter is a desired voice signal as shown in Equation 4.

Where m represents the serial number of the microphone, n represents the serial number of the sound source, l represents the serial number of the frame, k represents the serial number of the frequency bin, $W^k$ represents the separation adaptive filter of the N×M matrix, and $S^k$ represents the blind source separation result signal of the N×1 matrix.

The advantages of the method over the harmonic structure estimation method are as follows.

In the case of the cleaner or the washing machine causing a very high internal noise, the performance of the harmonic structure estimation is significantly reduced. Therefore, it is impossible to apply the harmonic structure estimation method to the cleaner or the washing machine. However, in a method according to one embodiment of the present disclosure, since the noise caused by the device is removed in advance, the above shortcoming may be overcome. In addition, the method of the present disclosure may be applied to various devices regardless of the device type.

Among the noise sources, the harmonic structures are also present in noise generated in an environment in which there are noise sources which output voices, such as sound outputted from a TV or other speakers that emit unwanted voices. Therefore, it is difficult to determine the sound source according to the related art. However, one embodiment according to the present disclosure does not use a harmonic structure, and thus is not affected by the type of noise source. Therefore, the sound source extraction in one embodiment according to the present disclosure may be robust to the noise source.

Noise may still be present in the separated voice signal. The residual variation noise removing filter 116 removes the residual variation noise included in the separated voice signal $h_j(k)$, and outputs a $y_j(k)$ signal as a result. The residual variation noise removing filter 116 repeatedly removes residual noise and outputs a desired voice signal.

When the BSS-based de-mixing step is completed, the desired signal g1 and the unwanted signal g2 are determined. The determination may be performed using an energy-based method.

The third step in the BSS-based noise reduction method is a post-processing step, where noise removing is further improved. One of the methods used in this step is the classical spectral subtraction method, which takes advantage of the fact that the residual noise component is characterized by a semi-fixed signal after the de-mixing step. This characteristic allows the proper estimation of the noise spectrum for the noise subtraction approach.

FIG. 9 is a frequency diagram of a signal measured in a sound processing process according to one embodiment of the present disclosure.

Referring to FIG. 9, a frequency graph of a signal processed by a sound processing method according to one embodiment of the present disclosure is shown. As shown in FIG. 1, in the environment in which the robot cleaner operates to clean the living room floor and a user gives a voice command to the robot cleaner while watching a TV from which sound is being outputted, operation noise of the robot cleaner, sound outputted from the TV including voices, and the user's voice are inputted to a plurality of microphones.

The first graph shows the signal inputted to the microphone. The first graph shows the signal inputted to the microphone, including the operation noise of the robot cleaner and sound outputted from the TV, in addition to the user's voice.

The second graph shows the resulting signal after signal processing at the front end. Although the tone noise and the multi-channel stationary noise have been removed by the signal processing at the front end of the sound processing apparatus 110, the user's voice is still mixed with the sound outputted from the TV.

The third graph shows the resulting signal after multi-channel signal processing. The desired voice signal, (that is, the voice signal of the user's utterance), is shown as a resulting signal, which is generated by the completion of the signal processing at the front end, the middle end configured for separating the sound sources, and the back end configured for removing the residual variation noise in the sound processing apparatus 110.

As described above, according to one embodiment of the present disclosure, in an environment in which an operation noise of a device and sound outputted from a TV, which may be misinterpreted as voice commands, are mixed, it is possible to provide a speech recognition system with a refined speech signal as a desired signal.

In addition, by observing a frequency spectrum, it is possible to effectively remove the noise in an inherent frequency band of the operation noise of the device.

In addition, a robust method may be used to select a desired sound source channel from various noise sources.

The example embodiments described above may be implemented through computer programs executable through various components on a computer, and such computer programs may be recorded in computer-readable media. Examples of the computer-readable media include, but are not limited to: magnetic media such as hard disks, floppy disks, and magnetic tape; optical media such as CD-ROM disks and DVD-ROM disks; magneto-optical media such as floppy disks; and hardware devices that are specially configured to store and execute program codes, such as ROM, RAM, and flash memory devices.

The computer programs may be those specially designed and constructed for the purposes of the present disclosure or they may be of the kind well known and available to those skilled in the computer software arts. Examples of program code include both machine code, such as produced by a compiler, and higher level code that may be executed by the computer using an interpreter.

As used in the present application (especially in the appended claims), the terms 'a/an' and 'the' include both singular and plural references, unless the context clearly states otherwise. Also, it should be understood that any numerical range recited herein is intended to include all sub-ranges subsumed therein (unless expressly indicated otherwise) and therefore, the disclosed numeral ranges include every individual value between the minimum and maximum values of the numeral ranges.

Also, the order of individual steps in process claims of the present disclosure does not imply that the steps must be performed in this order; rather, the steps may be performed in any suitable order, unless expressly indicated otherwise. In other words, the present disclosure is not necessarily limited to the order in which the individual steps are recited. All examples described herein or the terms indicative thereof ("for example", etc.) used herein are merely to describe the present disclosure in greater detail. Therefore, it should be understood that the scope of the present disclosure is not limited to the example embodiments described above or by the use of such terms unless limited by the appended claims. Also, it should be apparent to those skilled in the art that various alterations, substitutions, and modifications may be made within the scope of the appended claims or equivalents thereof.

The present disclosure is thus not limited to the example embodiments described above, and rather intended to include the following appended claims, and all modifications, equivalents, and alternatives falling within the spirit and scope of the following claims.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

DESCRIPTION OF SYMBOLS

100: device
101: terminal
102: artificial intelligence speaker
104: robot cleaner
110: sound processing device
111: adaptive line enhancer
112: noise source sensor
113: multi-channel stationary noise remover
114: multi-channel blind source separator
115: voice extractor
116: residual variation noise removing filter

What is claimed is:

1. A sound processing method performed by a sound processing apparatus, the sound processing method comprising:
   extracting a desired signal from among signals generated by a plurality of sound sources collected through a plurality of channels using a plurality of microphones, the extracting the desired signal comprising:
      separating a voice signal for each sound source based on a sound signal by using a multi-channel blind source separation method based on an independent vector analysis;
      comparing power values of off-diagonal elements of a full frequency band for each channel of an adaptive filter in a sound source separator; and
      extracting the desired signal based on a magnitude of a power value of a voice signal generated by a sound source and the sum of off-diagonal values of the adaptive filter.

2. The sound processing method according to claim 1, further comprising performing a time to frequency transformation.

3. The sound processing method according to claim 1, further comprising at least one of:
   removing an operation noise of a tone component generated by an operation of a device and inputted to one of the plurality of microphones; and
   removing white noise generated by the operation of the device.

4. The sound processing method according to claim 3, wherein the removing the operation noise of the tone component comprises removing noise by using a noise source sensor and an adaptive line enhancer (ALE).

5. The sound processing method according to claim 4, wherein at least one of a microphone, an acceleration sensor, and a vibration sensor is used as the noise source sensor to remove the noise.

6. The sound processing method according to claim 3, wherein the removing the white noise comprises removing the white noise by using multi-channel stationary noise reduction.

7. The sound processing method according to claim 1, further comprising removing residual variation noise from the desired signal.

8. A sound processing apparatus configured to process a sound signal, comprising:
   a memory storing one or more instructions; and
   one or more processors configured to execute the one or more instructions to:
   separate a desired signal from among signals generated by a plurality of sound sources collected through a plurality of channels using a plurality of microphones,
   wherein the separating the desired signal comprises performing multi-channel blind source separation so as to separate sound sources based on an independent vector analysis, and extracting the desired signal based on a magnitude of a power value of a voice signal generated by the sound source and the sum of off-diagonal values of an adaptive filter,
   wherein the sound source separator the extracting the desired signal comprises:
   separating a voice signal for each sound source based on a sound signal; and
   extracting a desired voice signal from the separated voice signals,
   wherein the extracting the desired voice signal further comprises extracting the desired voice signal by comparing power values of off-diagonal elements of a full frequency band of the adaptive filter.

9. The sound processing apparatus according to claim 8, wherein the one or more processors are further configured to execute the one or more instructions to:
   perform a time to frequency transformation.

10. The sound processing apparatus according to claim 8, wherein the one or more processors are further configured to execute the one or more instructions to:
    remove an operation noise of a tone component generated by an operation of a device and inputted to one of the plurality of microphones; or
    remove white noise generated by the operation of the device.

11. The sound processing apparatus according to claim 10, wherein the removing the operation noise comprises removing the operation noise by using a noise source sensor and an adaptive line enhancer.

12. The sound processing apparatus according to claim 10, wherein the removing the operation noise comprises removing the operation noise by using at least one of a microphone, an acceleration sensor, and a vibration sensor, as a noise source sensor.

13. The sound processing apparatus according to claim 10, wherein the removing the white noise comprises removing the white noise by using multi-channel stationary noise reduction.

14. The sound processing method according to claim 8, wherein the one or more processors are further configured to execute the one or more instructions to:

remove residual variation noise from the desired voice signal.

15. A sound processing apparatus for extracting a desired voice signal from a sound signal in which an operation noise of a device and other voices are mixed, the sound processing apparatus comprising:

a plurality of microphones configured to allow a sound signal to be collected through a plurality of channels;

a memory storing one or more instructions; and one or more processors configured to execute the one or more instructions to:

remove noise from the sound signal; and perform multi-channel blind source separation so as to separate sound sources in the noise-removed sound signal based on an independent vector analysis, wherein performing the multi-channel blind source separation comprises extracting a desired voice signal from the channel having a smallest sum of off-diagonal values of an adaptive filter when an intensity of a desired voice is larger than an intensity of the other voices.

* * * * *